United States Patent [19]

Kraul et al.

[11] Patent Number: 4,926,448

[45] Date of Patent: May 15, 1990

[54] METHOD AND APPARATUS FOR IMPLEMENTING AN ESCAPE SEQUENCE

[75] Inventors: Douglas R. Kraul, Duluth; Stuart A. Cox, Woodstock, both of Ga.

[73] Assignee: Hayes Microcomputer Products, Inc., Norcross, Ga.

[21] Appl. No.: 243,084

[22] Filed: Sep. 9, 1988

Related U.S. Application Data

[62] Division of Ser. No. 860,052, May 6, 1986, abandoned.

[51] Int. Cl.$^5$ .............................................. H04L 23/00
[52] U.S. Cl. ........................................ 375/121; 370/84
[58] Field of Search ....................... 375/7, 8, 36, 9, 23, 375/121; 370/84, 94, 92, 95; 340/825.1, 825.5, 825.51

[56] References Cited

U.S. PATENT DOCUMENTS

| | | | |
|---|---|---|---|
| 4,001,504 | 1/1977 | Hendrickson | 375/121 |
| 4,387,440 | 6/1983 | Eaton | 364/900 |
| 4,440,988 | 4/1984 | Heatherington | 375/9 |
| 4,504,802 | 3/1985 | Heatherington | 375/9 |
| 4,549,302 | 10/1985 | Heatherington | 375/8 |
| 4,644,563 | 2/1987 | Ohishi et al. | 375/23 |
| 4,727,370 | 2/1988 | Shih | 340/825.1 |

Primary Examiner—Douglas W. Olms
Assistant Examiner—Stephen Chin
Attorney, Agent, or Firm—Jones, Askew & Lunsford

[57] ABSTRACT

A multi-port message buffer which is responsive to an escape sequence. A control unit controls whether the message buffer is in a transparent mode or a command mode with respect to a particular port. The control unit monitors a data port for the escape sequence and, if the escape sequence is detected, the control unit causes the message buffer to enter into the command mode with respect to that port. The escape sequence is a break sequence of a predetermined period, followed within a predetermined time by a predetermined character at a predetermined data transmission speed. The escape sequence can therefore be detected even if the currently programmed data transmission speed for that particular port is unknown.

18 Claims, 3 Drawing Sheets

METHOD AND APPARATUS FOR IMPLEMENTING AN ESCAPE SEQUENCE

This is a divisional application of U.S. patent application Ser. No. 860,052, filed May 6, 1986, by Kraul et al., entitled "Message Buffer With Improved Escape Sequence and Automatic Document Marking" now abandoned.

TECHNICAL FIELD

This invention relates to digital data equipment and more particularly to message buffers for transferring data between digital data devices.

BACKGROUND OF THE INVENTION

Some digital data devices, such as printers, are considered to be slow speed devices because their limited memory size and the time required to print a character result in a low average data transfer rate. Other digital data devices, such as computers, are considered to be high speed devices because they can send, receive, and process data at a high average rate.

When a high speed device, such as a computer, is connected directly to a low speed device, such as a printer, the computer cannot send a document to the printer as one prolonged data stream at high speed but must send the document as numerous short bursts of data. This prevents the computer from using the part of its memory in which the document resides and also prevents the computer from spending full time on another processing task.

In order to speed up the document transfer and free the computer and its memory to perform other tasks, message buffers, sometimes called "spoolers", were developed. Spoolers generally have a high speed input-only port connected to the computer and a low-speed output-only port connected to the printer, a memory for temporarily storing the document, and a control unit which receives the document at high speed from the computer and writes the document into the memory, and also reads the document from the memory and sends the document at low speed to the printer. This allows the computer to quickly send the entire document and turn to other tasks while the printer prints the document at its more leisurely rate.

However, most spoolers view the entire contents of their memory as long documents. If the user sends two or more documents to the spooler, and then activates the replay feature, all of the documents in the memory will be printed again, even if the user only desired for a reprint of one document.

Some spoolers have a switch or switches so that the user can normally mark the beginning and end of a document. If this is properly done, then activating the replay feature will generally replay only the last document. However, if the user forgets to mark the beginning and end of the document the spooler memory is open and successive documents will be collected in memory as one long document. If the user then activates the replay feature, the entire set of documents will be printed.

There is therefore a need for a message buffer which automatically marks the beginning and end of a document, thereby separating successive documents so that activating the replay feature will cause printing of only the last document.

Also, most spoolers continually reuse the memory so that, at some point, a new document will be written over an older document. However, on occasions, the user may have a document which he wishes to be saved so that he can replay the document at a later time. There is therefore a need for a message buffer which has a provision for saving a document by preventing the memory in which the document is stored from being overwritten by a later document.

In some message buffers, the input and output parameters, such as baud rate, parity, etc., are determined by switches. However, the switches are usually small, generally located on the back of the device or in another inconvenient place, or require a manual to determined the meaning of the switch settings.

There is therefore a need for a message buffer which has command and on-line, or transparent, modes of operation so that the input and output parameters can be controlled by programming signals via an input port. Those skilled in the art will be familiar with command driven modems having both command and on-line modes of operation, such as those shown in U.S. Pat. No. 4,549,302 to Heatherington and U.S. Pat. No. 4,387,440 to Eaton.

Also, there is a need for a message buffer, having a command mode and an on-line mode, to be responsive to a command, through an input port, to change from the on-line mode to the command mode. This command is often called an escape sequence.

However, if the data in a document forms the escape sequence the message buffer will abruptly and unexpectedly switch from the data transfer mode to the command mode. The message buffer will then consider any other information in the document to be a series of valid or invalid commands. At best, the data transfer will be stopped; at worst, the entire contents of the memory will be erased, destroying any documents there, and the operating parameters will be inadvertently changed.

If the input and output parameters of the message buffer are thus inadvertently changed, the data terminal and the message buffer will be attempting to communicate at different speeds, parity, etc. The user will then have to resort to a frustrating trial and error approach of changing the input and output parameters of the data terminal until they match the new, unknown input and output parameters of the message buffer.

There is therefore a need for a message buffer which will automatically change its input and output parameters to a known set of parameters upon receipt of a unique escape command, thereby allowing the data terminal tO easily establish or re-establish communication with the message buffer.

Additionally, a message buffer of the type described in this specification is one species of a multispeed asynchronous data communications device. More particularly, the present invention includes at least one port which normally operates as a port for data communications equipment (DCE) as described in EIA Revised Standard RS-232-C. This port is normally configured to be connected to a data terminal equipment (DTE) output port from a computer or terminal.

The preferred embodiment of the present invention is one for which the DCE port may be operated at a plurality of different data speeds. Since the preferred embodiment is designed to have a command mode and a data transmission (transparent) mode of operation for communications into the above referenced DCE port, it is important that the present invention be configured so that it may be forced into its command mode by the data terminal equipment to which it is attached, irrespective of the data speed at which the data terminal equipment is operating. In the prior art, such an arrangement was not possible unless there was a pre-agreed upon data speed for both the data communications equipment and the data terminal equipment, and both devices were forced to their initial states.

However, the present invention is one in which several functions from the data terminal equipment (normally a computer) will be routed to the DCE input port of the present invention. As the computer changes its mode of operation to route different data to the input port of the present invention, the software controlling the output port of the computer may force this port to operate at different data speeds. Therefore, there is a need to establish a method, and to provide apparatus for executing the method, of operating the DCE input port of a multispeed asynchronous device so that the data terminal equipment to which it is attached can force the DCE into its command mode irrespective of the data speed at which the DTE is operating.

In the prior art, it has been known to use a break sequence provided to data communications equipment to force the equipment into a change of operating state. As will be known to those skilled in the art, a break sequence is executed by establishing a particular logic condition on a data transmission line, for at least a predetermined period of time, when the logic condition differs from the logic condition on the data transmission line when the data terminal equipment is idle (not sending any data).

However, the present invention is one in which the prior art approach is inapplicable. First, as will be apparent from the description of the preferred embodiment to follow, the present invention is one which includes modes of operation for which the device must be transparent to a break condition. In other words, if a break condition is received at the input DCE port, it is necessary under some circumstances to transmit the break condition to an output port of the present invention. The particular example which comes to mind is when the preferred embodiment is in a mode of operation connecting its DCE input port to an output port which is in turn connected to a modem. It is often necessary to send a break sequence on to the modem for transmitting an equivalent modulated sequence to the device with which the modem is communicating.

Secondly, if the user of the computer to which the DCE input port of the present invention is connected has called another program which will communicate with the present invention, the newly called program does not have any way of knowing the data speed of the most recent mode of operation of the input port of the present invention. Thus, there is a need to provide the computer with a dependable scheme for forcing a multispeed data communications device into its command mode of operation, irrespective of its current operational state, particularly with respect to data transmission speed.

SUMMARY OF THE INVENTION

The present invention provides such a message buffer.

Broadly stated, the present invention provides a message buffer which automatically marks the beginning and end of a document and allows the user to save a document for transmittal at a later time.

Also broadly stated, the present invention provides a message buffer which automatically reverts to a predetermined input and output parameter setting upon receipt of a predetermined sequence.

In its preferred form, the present invention automatically defines a document as being the input data between two predetermined periods of no input data.

In its preferred form, the present invention allows the user to designate, after the document has been sent from the computer that the document is to be saved in a replay buffer and not overwritten.

In its preferred form, the present invention allows other documents to be sent to or from the computer and to be sent to the printer even when there is a document stored and saved in the replay buffer.

In its preferred form the present invention also provides for selectably appending additional information to a document which has been stored and saved in the replay buffer.

In its preferred form the present invention has a command mode and an on-line mode so that its operating parameters may be changed by commands via an input port.

In its preferred form the present invention also changes from a data transfer mode to a command mode and reverts to a predetermined set of input/output parameters for a particular port when the break signal into that port from the computer is present for a predetermined period of time and is followed by a predetermined character in accordance with a predetermined set of parameters.

Generally speaking, this aspect of the present invention is usable in any multispeed asynchronous data communications device having both a command mode and a transparent (or data transmission) mode of operation. As stated above in the Background of the Invention section, the fundamental problem is to provide apparatus in the data communications equipment which will always respond to a particular signal sequence as an escape sequence, irrespective of the most recent data speed at which the data communications equipment has been operating. By implementing escape sequence apparatus in the data communications equipment, it is then possible to allow the data terminal equipment to always force the data communications equipment into its command mode of operation irrespective of the previous data speed at which the DCE was operating.

Generally stated, this aspect of the present invention is met by defining the escape sequence of the data communications equipment as provision of a particular nonidle signal condition for a predetermined period of time followed by the provision of a particular character at a predetermined one of the possible data speeds at which the data communications equipment can be operated.

It is preferred that the first condition be met by provision of well known break sequence for a predetermined period of time.

In the preferred embodiment, the escape sequence is further defined by this break sequence being followed by a particular character being transmitted at the highest data speed at which the data terminal equipment can be operated. When these two signals occur contiguously in time, the present invention will be forced into its command mode of operation.

Therefore, any time data terminal equipment, or computer, to which the input port of the present invention is connected needs to force the present invention into its command mode, it need only provide a long break sequence of a predetermined length followed by a provision of a predetermined character at the highest speed of operations (9600 bits per second in the preferred embodiment) and the preferred embodiment will be forced to its command mode.

Naturally, in the preferred embodiment a predetermined data speed for the command mode is initially selected so that the data terminal equipment to which it is attached can provide recognizable commands.

This aspect of the present invention allows the preferred embodiment to be transparent to a break sequence under conditions for which it is needed. It also allows the data terminal equipment to which the present invention is attached to dependably and immediately force data communications equipment embodying the present invention into its command mode without letting the data terminal equipment provide unrecognizable characters resulting in bogus transmission of data to an output port of the present invention.

It is therefore an object of the present invention to provide a message buffer which is responsive to breaks in the data stream for defining the beginning and end of a document.

It is another object of the present invention to provide a message buffer which allows a selected document to be saved and, if desired, appended.

It is another object of the present invention to provide a message buffer which allows a later document to be transferred and printed while an earlier document is still stored and saved.

It is a further object of the present invention to provide a message buffer which is responsive to an escape sequence comprising a break signal in the data input stream followed by a predetermined character.

That the present invention meets these and other objects of the present invention will be apparent from the detailed description below.

DETAILED DESCRIPTION OF THE INVENTION

Turning now to the drawings, in which like numerals reference like components throughout the several figures, the preferred embodiment of the present invention will be described.

Figure 1:
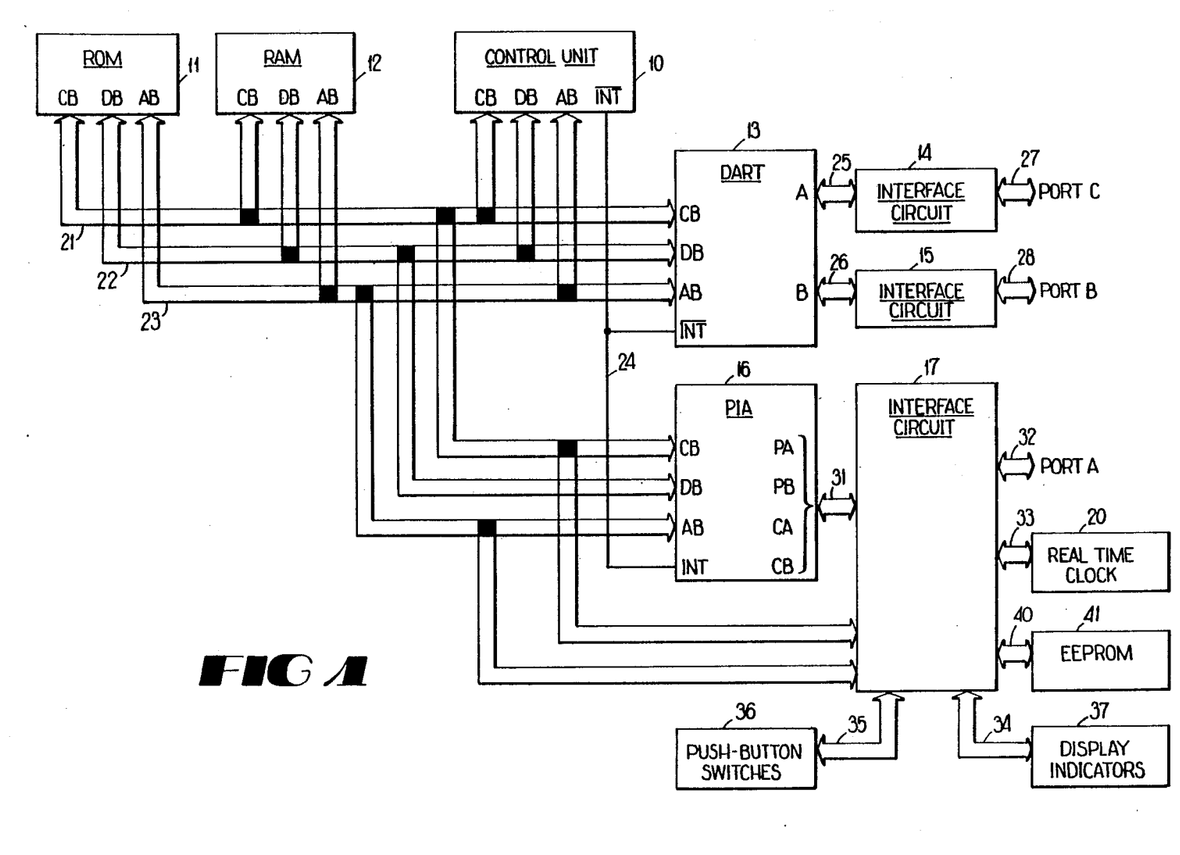
FIG. 1 is a block diagram of the preferred embodiment of the present invention.

FIG. 1 is a block diagram of the preferred embodiment of the present invention. Control unit 10 comprises a microprocessor, multiplexers, clock oscillator, bus logic circuits, and control and decoding circuits. The particular microprocessor used in control unit 10 is not critical but must be fast enough to accommodate the combined data rates of the three ports, A, B, and C.

Read only memory (ROM) 11 comprises a standard ROM and may also comprise an electrically erasable programmable read only memory (EEPROM). The standard ROM section contains the operating instructions for control unit 10 and default settings for the various programmable parameters. The EEPROM section contains user-selected settings for certain of the various programmable parameters. However, in the preferred embodiment, the EEPROM section is separate from the standard ROM and is addressed via PIA 16, discussed below. Methods of programming and operation of ROM 11 are well known to those skilled in the art.

Random access memory (RAM) 12 may be a static or a dynamic RAM. In the preferred embodiment, RAM 12 is a dynamic RAM. RAM 12 must be large enough to accommodate storage of any desired document. In the preferred embodiment, RAM 12 is 128K-by-8 bits and is expandable to 512K-by-8 bits.

DART 13 is a dual universal asynchronous receiver transmitter which, it will be appreciated by one skilled in the art, comprises two universal asynchronous receiver transmitters (UARTs) in a single package sharing common control, address, interrupt and data terminals. One skilled in the art will be familiar with the operation of a dual UART such as DART 13. In the preferred embodiment, DART 13 is a Z8530 serial communications controller (SCC), manufactured by Zilog, Inc., of Campbell, CA. Detailed information on the Z8530 is available from the manufacturer upon request. DART 13 is used to transfer data to and from the two serial input/output ports, B and C.

PIA 16 is a peripheral interface adapter. In the preferred embodiment, PIA 16 is an R6522 manufactured by Rockwell International of Newport Beach, CA. Detailed information on the R6522 device is available from the manufacturer upon request. PIA 16 can be configured to have two eight-bit bidirectional input/output ports PA and PB, an eight-bit bidirectional data port, a serial data port, programmable control and status registers, and two 16-bit programmable timers/counters. PIA 16 is used to transfer data to the output port, A, and is also used to interface with control switches 36, display indicators 37, the real time clock 20, and the EEPROM 41.

Interface circuit 14 comprises line drivers, a multiplexer, and input and output decoupling networks. Interface circuit 14 accepts signals from port C, buffers them, and sends them to the A section of DART 13. Interface circuit 14 also accepts signals from the A section of DART 13, buffers them, and sends them to port C.

Interface circuit 15 performs a similar function as interface circuit 14 but with respect to the B section of DART 13 and port B. Methods of construction of interface circuits 14 and 15 are well known to those skilled in the art.

Switches 36 comprises a set of push-button switches which, for convenience, are called SELECT, MARK, and REPLAY. The SELECT switch 36 allows the user to select one of a set of predetermined data paths, e.g.—port A to port C, port B to port C, port B to ports A and C, etc. Means of programming control unit 10 to sense the SELECT switch 37 and route the data accordingly are well known to those skilled in the art.

Display indicator 37 comprises a set of light emitting diodes, one of which, for convenience, is called the MARK indicator. Display indicator 37 displays the status and may include other indicator 37 such as "POWER", "READY", "PATH SELECTOR", etc. Means of programming control unit 10 to display the status by indicator 37 are well known to those skilled in the art.

Real time clock 20 is a clock timer and, once set, keeps track of the time and the date. In the preferred embodiment, real time clock 20 is an MSM5832RS manufactured by OKI Semiconductor of Sunnyvale, CA. Detailed information on the MSM5832RS is available from the manufacturer upon request. In the preferred embodiment real time clock 20 has a battery backup power supply (not shown) so that the correct time will be maintained even when normal operating power is not available.

In the preferred embodiment, real time clock 20 is read by control unit 10 upon a power up reset, or reset. After that, control unit 10 periodically updates a time of day (TOD) clock register in RAM 12 instead of periodically reading the real time clock 20. This method was chosen simply to save processing time for control unit 10.

Interface circuit 17 comprises a bidirectional eight bit data buffer, input and output buffers, multiplexers, latches, and address and decoding logic. Interface circuit 17 accepts and buffer signals from PIA 16 to port A and from port A to PIA 16. Interface circuit 17 also accepts signals from the switches 36 and provides them to PIA 16. Interface circuit 17 also accepts signals from PIA 16 and control unit 10 and provides latched output signals to the display indicator 37. Interface circuit 17 also routes control signals from PIA 16 and control unit 10 to real time clock 20 and time signals from real time clock 20 to PIA 16. Interface circuit 17 also routes control signals from PIA 16 and control unit 10 to EEPROM 41 and data signals from EEPROM 41 to PIA 16. It will be appreciated that PIA 16 and interface buffer 17, in addition to handling signals to and from port A, provide a means for routing signals to the real time clock 20, EEPROM 41, and the display indicator 37, and signal from the real time clock 20, EEPROM 41, and the switches 36. Means of construction of interface circuit 17 are well known to those skilled in the art.

Port A is a fifteen conductor parallel/serial output port. If port A is connected to a parallel input printer, eight conductors are used for the parallel eight-bit data byte output, one conductor is the negated strobe signal output, one conductor is the negated acknowledge signal input, one conductor is the busy signal input, one conductor is the PE signal input, one conductor is the negated INIT signal output, one conductor is the negated error signal input, and one conductor is the system ground.

If port A is connected to a serial input printer, only six conductors are used. The negated strobe signal conductor is now used for the serial transmit data output. The busy signal input conductor is now used for the data set ready signal input.

Further more, in order to indicate to control unit 10 that the printer connected to port A is a serial printer, the plug (not shown) connecting port A to the printer has two jumpers. One jumper is from the system ground conductor to a first predetermined one of the parallel eight-bit data output conductors. Another jumper is from the negated INIT signal output conductor to a second predetermined one of the parallel eight-bit data output conductor. Control unit 10 places a predetermined data signal on the negated INIT conductor and looks at the signal present on the first one and then second one of the parallel eight-bit output conductors. If the signal on the first one of the parallel eight-bit data output conductors is system ground, and the signal on the second one of the parallel eight-bit data output conductors in the same as the predetermined data signal on the negated INIT conductor, then control unit 10 determines that the printer connected to port A is a serial printer and configures port A accordingly.

The predetermined data signal may be a series of alternating logic 1's and 0's, or any other convenient series. In the preferred embodiment, the first predetermined conductor is the D3 conductor and the second predetermined conductor is the D4 conductor, where D0 is the least significant bit of the parallel eight-bit data output.

Port C is a nine conductor serial input/output port. The nine conductors are: chassis ground, system ground, data carrier detect input, data terminal ready output, data set ready input, transmit data plus and transmit data minus outputs, and receive data plus and receive data minus inputs. The transmit data plus and transmit data minus outputs form a transmit data differential output pair. Likewise, the receive data plus and receive data minus inputs form a receive data differential input pair.

These two differential pairs allow port C in the preferred embodiment to be used with devices which require these differential input and output connections. If the device connected to port C does not require a differential input and output connection, then the receive data plus input is connected to system ground at port C and the transmit data plus input is not used.

Port B is also a nine conductor serial input/output port. The nine conductors are: system ground, data carrier detect input, receive data input, transmit data input, data terminal ready output, data set ready output, ready to send output, clear to send input, and ring indicator input.

In the preferred environment of the preferred embodiment of the present invention, port C is connected to the serial input/output port of a computer and port B is connected to the serial input/output port of a modem.

Control unit 10 is connected by control bus 21, data bus 22, and address bus 23 to ROM 11, RAM 12, DART 13, and PIA 16. Control unit 10 is also connected by control bus 21 and address bus 23 to interface circuit 17. The negated interrupt request outputs of DART 13 and PIA 16 are connected by conductor 24 to the negated interrupt request input of control unit 10. The section A inputs and outputs of DART 13 are connected by a plurality of conductors 25 to the outputs and inputs, respectively, of interface circuit 14. The serial inputs and outputs of interface circuit 14 are connected to serial input/output port C by a plurality of conductors 27. The section B inputs and outputs of DART 13 are connected by a plurality of conductors 26 to the outputs and inputs, respectively, of interface circuit 15. The serial inputs and outputs of interface circuit 15 are connected to said input/output port B by a plurality of conductors 30.

The port A (PA), port B (PB), control A (CA), and control B (CB) inputs and outputs of PIA 16 are connected by a plurality of conductors 31 to the outputs and inputs, respectively, of interface circuit 17. The parallel/serial inputs and outputs of interface circuit 17 are connected to parallel/serial output port A by a plurality of conductors 32. The switch inputs of interface circuit 17 are connected by a plurality of conductors 35 to the outputs of the switches 36. The display outputs of interface circuit 17 are connected by a plurality of conductors 34 to the inputs of the display indicators 37. The clock control and data inputs and outputs of interface circuit 17 are connected by a plurality of conductors 33 to the control and data outputs and inputs, respectively, of real time clock 20. The EEPROM control and data inputs and outputs of interface circuit 17 are connected by a plurality of conductor 40 to the control and data outputs and inputs, respectively, of EEPROM 41.

The operation of the preferred embodiment of the present invention will now be described. The preferred embodiment is configured as a polled system. The polling rate is conveniently chosen as 1200 times per second. PIA 16 is programmed by control unit 10 to generate an interrupt every 1/1200 second. On every interrupt, control unit 10 updates the TOD clock register in RAM 12, refreshes a part of RAM 12, reads any incoming data in DART 13, updates the outgoing handshake signals for ports A, B and C, and, if port A is configured for a serial output, updates, if the printer is ready, the data going to port A. On every other interrupt control unit 10 refreshes the display indicators 37, updates, if permitted, the data going to ports B and C, checks the incoming handshake signals on ports A, B and C, and, if port A is configured for parallel output, updates, if the printer is ready, the data going to port A. Control unit 10 checks the status of switches 36 every sixteen interrupts. Although the negated interrupt request output of DART 13 is connected to control unit 10, this negated interrupt request output is disabled so that PIA 16 is the only source of interrupts for control unit 10. Methods of programming control unit 10 and PIA 16 to accomplish polling at 1200 times per second are well known to those skilled in the art.

Control unit 10 divides RAM 12 into several parts. The two parts of interest are called the replay buffer and the immediate buffer. The particular areas of RAM 12 which are used by these two buffers vary dynamically in size and location depending upon the document or documents stored in RAM 12.

A document stored in the replay buffer may be replayed and may be protected. However, a document in the immediate buffer may neither be replayed nor protected.

The preferred embodiment has two modes: command mode, and on-line mode. However, control unit 10 may be in the command mode with respect to one port, for example, port H, and be in the on-line mode with respect to the other port, port C. It will be recalled that port A is an output-only port and so control unit 10 is always on-line with respect to port A.

When control unit 10 is in the command mode the user may define data transfer paths, e.g., port B to port A, port B to ports A and C, etc., configure the input/output parameter settings, e.g., baud rate, number of bits, parity, etc., and define other desired operating parameters. The use of a command mode and an on-line mode in modems is well known to those skilled in the art and is applicable to the present invention.

Assume now that a computer (not shown) is connected to port B, a printer (not shown) is connected to port A, and that ports A and B are properly configured to operate with the printer and computer, respectively. Also assume that control unit 10 is in the on-line mode with respect to port B.

When the user sends a document from port B, control unit 10 will read the data from DART 13, store the data in RAM 12, and increment the replay buffer input pointer. Control unit 10 will also read the stored data from RAM 12, send it to PIA 16, and increment the replay buffer output pointer. PIA 16 sends the data to the printer via port A. It will be appreciated that data from port B may be read and stored in RAM 12 at different intervals than the data is read from RAM 12 and sent to port A. Means of programming control unit 10 to perform this type of input/output function are well known to those skilled in the art.

If the user presses the REPLAY button 36, control unit 10 will reset the replay buffer output pointer and begin reading from the replay buffer in RAM 12 and sending to the printer via port A another copy of the document.

If the user begins sending a second document within a predetermined period of time, called, for convenience, the spacing time, control unit 10 will consider the second document to be part of the first document, will append it to the end of the first document, and also store the second document in the replay buffer of RAM 12 as part of the first document.

However, assume that the user desires that the second document retain a distinct identity and not be part of the first document. In this case the user will, after the first document has been sent, wait for a period longer than the spacing time before beginning sending the second document. Control unit 10 will consider the longer period to be an indication that the first document has been completed. Control unit 10 will then mark, in RAM 12, the end of the first document and also the beginning of the second document.

As soon as the first document has been printed, control unit 10 will clear any pointers to the first document. Since there are no pointers to the first document it is nOw inaccessible. The first document may therefore be considered to have been erased from RAM 12. The replay buffer will then contain only the second document.

If the user now presses the REPLAY button 36, control unit 10 will reset the replay buffer output pointer to the beginning of the second document and begin reading from the replay buffer in RAM 12 and sending to the printer via port A another copy of the second document.

This happens because the longer period between the first document and the second document causes control unit 10 to distinguish between the two documents and erase the first document from the replay buffer. Therefore, when the user pressed the REPLAY button 36, the only document in the replay buffer in RAM 12 is the second document. This is advantageous over prior art message buffers where pressing the REPLAY button caused the entire contents of the memory to be printed, i.e., every document sent since the last manual erase.

The above description therefore provides a method of using a spacing timer for automatically marking the end of a document, and therefore the beginning of a successor document so that pressing the REPLAY button will normally only cause the last document, rather than all documents, to be printed.

However, assume now that the user had begun sending the first document and was interrupted for some reason for a period longer than the spacing time. Control unit 10 has now automatically marked the end of the first document so if the user begins sending more data control unit 10 will treat the new data as a second document instead of more of the first document.

In the preferred embodiment, in order to remove the mark at the end of the first document the user will press and hold MARK button 36 until MARK indicator 37 begins to blink, and then release MARK button 36. By holding MARK button 36 for this period of time, the user instructs control unit 10 to protect the first document in the replay buffer in RAM 12. Control unit 10 acknowledges the instruction by causing MARK indicator 36 to blink. By this action the user has protected the first document in the replay buffer in RAM 12. Therefore, at this time, no other data can be entered into the replay buffer. The blinking of MARK indicator 37 is merely an acknowledgment of the instruction to the user. It will be appreciated that other methods of acknowledgment may also be used. Means of programming control unit 10 to sense the status of MARK button 36 and cause MARK indicator 37 to blink are well known to those skilled in the art.

If the user now begins sending more data, control unit 10 views this as a separate document and, since the contents of the replay buffer are protected, will store this data in the immediate buffer in RAM 12 and also cause the data in the immediate buffer to be read and sent to the printer. Documents in the immediate buffer cannot be replayed or protected.

However, if, after pressing and holding the MARK button 36, the user again presses the MARK button 36 until the MARK indicator 37 is steadily on, and then releases MARK button 36, control unit 10 will unlock the replay buffer and remove the end mark. Now, any data from the user is appended to the first document and becomes part of the first document. At this point, however, the contents of the replay buffer may be appended, but are otherwise protected, and the spacing time automatic document marking feature is disabled.

It will be appreciated that control unit 10 marks the beginning and end of a document by reading and storing in RAM 12 the starting and final values of the replay buffer input pointer. Control unit 10 also prefixes each document with a header which specifies the port to which the document is to be routed. Means of programming control unit 10 to read and store pointer values are well known to those skilled in the art.

Assume now that, for some reason, the user has changed the input/output parameters of the computer, but not of port B, and desires to reestablish communication through port B.

In practice, this normally occurs as the user of a computer (not shown) attached to port B starts a new applications program which must communicate with the preferred embodiment. The new applications program has no way of knowing the present data speed and other parameter at which port B is operating.

The preferred embodiment also responds to the well known Hayes AT command set escape sequence described in U.S. Pat. No. 4,459,302 to Heatherington. However, for the AT command set escape sequence to operate, both the computer and port B must be operating at the same speed. Thus, unless the new applications program can correctly guess the data speed for port B, the AT command set escape sequence cannot be used. Then, in order to reestablish the command state so that the computer can communicate with control unit 10 the new program will: (1) set the input/output parameters of the computer to 9600 bits/second, 8 data bits/character, no parity bit, and one stop bit; (2) send a break signal for at least a first predetermined amount of time, called the minimum break time, (3) drop the break signal within a second predetermined time of the beginning of the first predetermined time period called the maximum break time, and (4) send a predetermined character within a third predetermined period of time, called the lapse time, of dropping the break signal. In the preferred embodiment, the minimum and maximum break times are conveniently chosen to be 800 and 1500 milliseconds, respectively, and the lapse time is conveniently chosen to be approximately 21 milliseconds.

In the preferred embodiment, the predetermined character is chosen to be the dollar ($) (ASCII 36) character. It will be appreciated that other characters, or combinations of characters, may also be used.

When control unit 10 detects a break signal for a period of about 800 milliseconds then, if the break signal is dropped within the next 700 milliseconds, control unit 10 reprograms the appropriate section of DART 13 for 9600 baud, 8 data bits per character, no parity bit, and one stop bit.

If, after sending the break signal for at least the minimum break time of 800 milliseconds, dropping the break signal before the maximum break time and within the lapse time, the first character sent by the computer is the $ character, at the parameters specified above, control unit 10 goes into the command mode. Thereafter, the user can communicate with control unit 10 at the parameters specified above and can, for example, command control unit 10 to change to another set of input/output parameters, execute other commands, or return to the on-line mode.

If, after the break signal is present for at least the minimum break time, the first character sent by the computer is not the $ character, or is a character sent at other than the 9600 baud, 8 data bits, no parity bit, one stop bit, parameters, then control unit 10 will reprogram section B of DART 13 back to the previous input/output parameters. In the preferred embodiment, no attempt is made to reconstruct the character so this first character will be lost. It will be appreciated that, if desired, control unit 10 can be programmed to reconstruct this first character. Also, if no character is sent within the lapse time, or by the end of the 1500 millisecond maximum break time, the break signal is not dropped, control unit 10 will reprogram section B of DART 13 back to the previous input/output parameters.

In an alternative embodiment of the present invention, the escape sequence will be recognized if the predetermined $ character is sent (at the predetermined speed, parity, etc.) as the first character after a break has been provided for at least the minimum break time, without timing the lapse time or the maximum break time.

It will now be appreciated that the above method is an improved escape sequence which allows a user to establish communication with the control unit 10 even when the user does not know the input/output parameters of the port to which the user is connected.

Figure 2A:
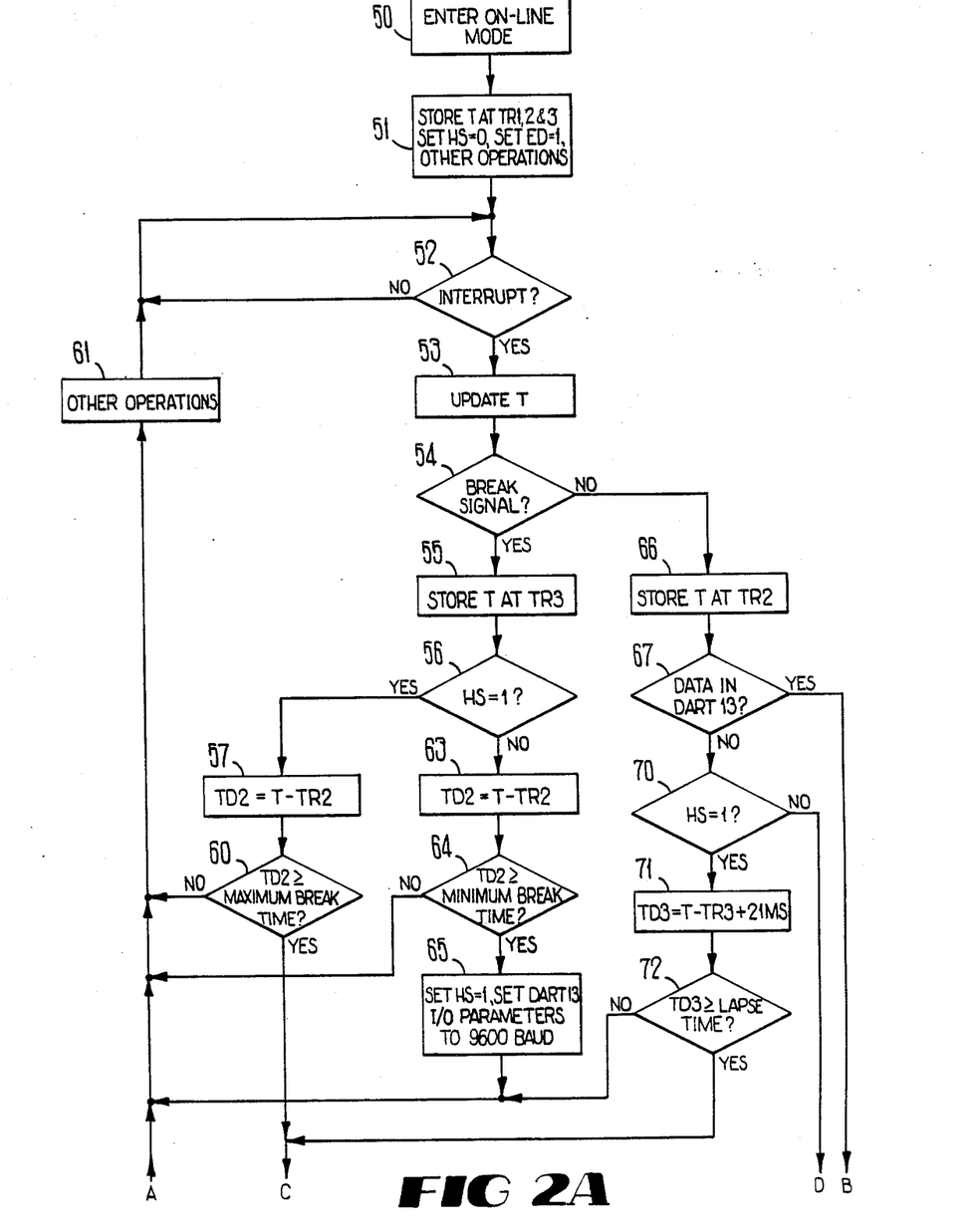
FIG. 2A is the first part of a flow chart of the automatic document marking and escape sequences.
Figure 2B:
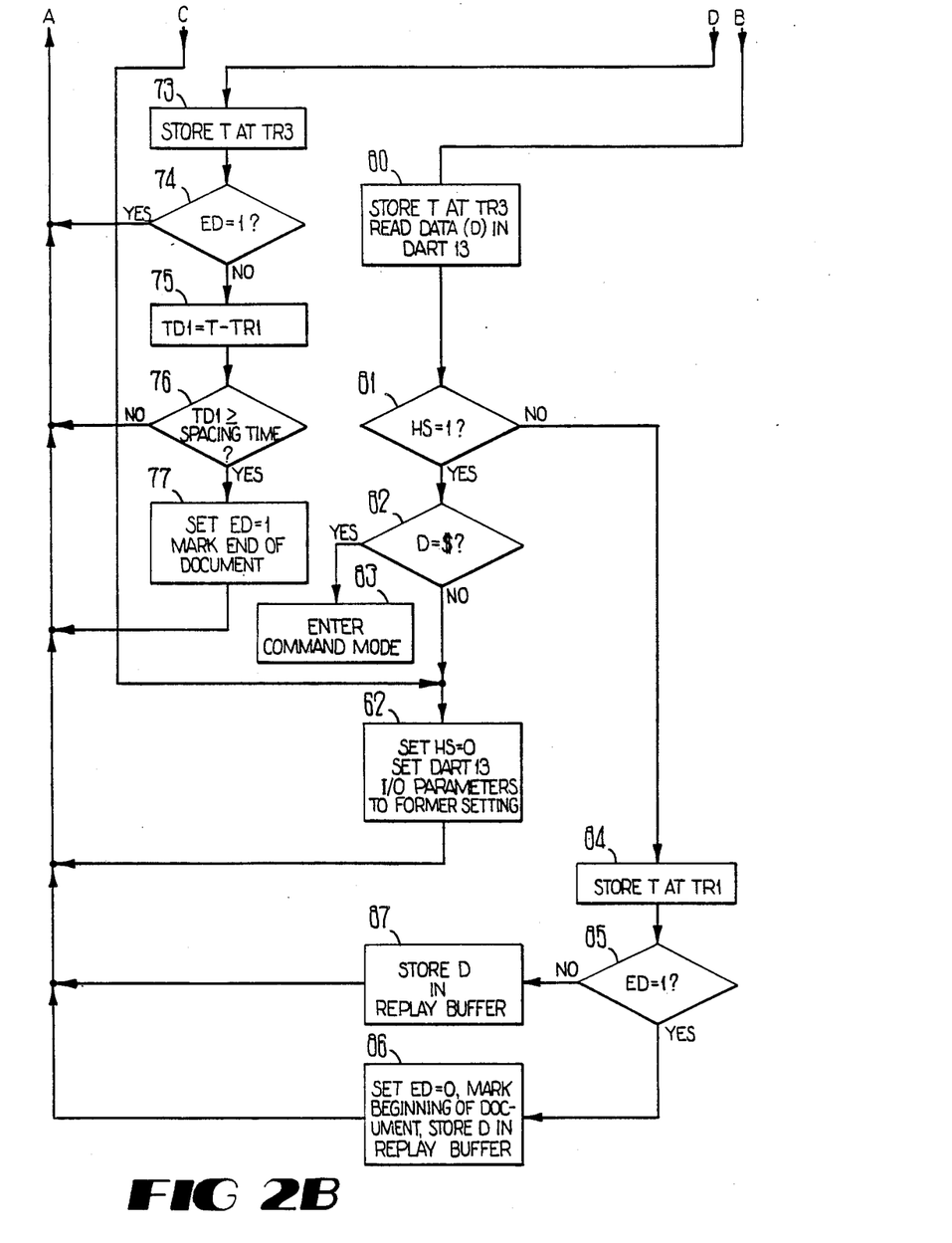
FIG. 2B is the second part of a flow chart of the automatic document marking and escape sequences.

Turn now to FIGS. 2A and 2B, which are a flow chart of the automatic document marking and escape sequences. Upon entering 50 the on-line mode control unit 10 sets 51 a high speed (HS) bit to 0 and an end document (ED) bit to 1. Control unit 10 also reads 51 the current time (T) in the TOD clock register and stores the current time (T) in registers TR1, TR2 and TR3 in RAM 12. Control unit 10 also performs 51 other operations such as RAM 12 refresh, indicator 37 refresh, read switch 36, send data to port A, etc.

Upon the interrupt 51 from PIA 16, control unit 10 updates 53 register TOD and then reads DART 13 to determine 54 if a break signal is present. If so, control unit 10 stores 55 the current time (T) in register TR3 in RAM 12 and then looks 56 at the HS bit. If HS=1, then control unit 10 reads 57 the current time (T) in the TOD register and computes an elapsed time TD2, where TD2=T−TR2, where TR2 is the time stored in register TR2. Control unit 10 then compares 60 TD2 to the maximum break time of 1500 milliseconds. If TD2 is less than the maximum break time, control unit 10 performs 61 the other operations.

If TD2 is equal to or greater than the maximum break time control unit 10 sets the HS bit to 0, sets 62 the input/output parameters of DART 13 back to the original setting, and then performs 61 the other operations. It will be appreciated that this is the maximum break time time-out provision.

If HS=0, control unit 10 computes 63 an elapsed time, TD2, where TD2=T−TR2. Control unit 10 then compares 64 TD2 to the minimum break time. If TD2 is less than the minimum break time control unit 10 performs 61 the other operations. If TD2 is equal to or greater than the minimum break time control unit 10 sets 65 the HS bit to 1, and sets the input/output (I/O) parameters of DART 13 to 9600 baud, 8 data bits, no parity bit, 1 stop bit, and performs 61 the other operations. It will be appreciated from the above that control unit 10 is looking at the break signal to determine if an escape sequence is in process.

If a break signal is not present control unit 10 stores 66 T in RAM 12 at TR2. Control unit 10 then determines 67 if there is data in DART 13. If there is no data present in DART 13 then control unit examines 70 the HS bit to determine if the escape sequence is in process. If the HS bit=1, then control unit 10 computes another elapsed time, TD3, where TD3=T−TR3+21 milliseconds. If TD3 is greater than or equal to the lapse time, 21 milliseconds, then control unit 10 sets 62 the HS bit to 0, sets the I/O parameters of DART 13 back to the original setting, and then performs the other operations. It will be appreciated that this implements the provision that the $ character must be received within 21 milliseconds of the dropping of the break signal. If TD3 is less than the lapse time, then control unit 10 performs 61 the other operations.

If 72 the HS bit=0, then control unit 10 stores 73 T in TR3 and then determines 74 if 70 the end of a document must be marked. If the ED bit=1, then there is no document in the replay buffer, or the end of any document has already been marked, so control unit 10 performs 61 the other operations.

If the ED bit=0, then there is a document in the replay buffer for which the end has not been marked. Control unit 10 then determines whether the spacing time has elapsed since the last data in DART 13. Control unit 10 therefore computes 75 another elapsed time TD1, where TD1=T−TR1, and compares 76 TD1 with the spacing time. If TD1 is less than the spacing time, control unit 10 performs 61 the other operations. If, however, TD1 is equal to or greater than the spacing time, control unit 10 determines that the document has ended, sets 77 the ED bit to 1, marks the end of the document, and performs 61 the other operations.

It will be appreciated from the above that control unit 10 is measuring the time since the last data in DART 13 to determine if the end of the document is to be marked.

If 67 data is present in DART 13 then control unit 10 must determine whether the data is the character of the escape sequence. Control unit 10 therefore stores 80 T in register TR3 and reads the data from DART 13. If 81 the HS bit is a 1, then a long break has previously occurred. If 81 the data is the $ character then control unit 10 enters 83 the command mode. If the data is not the $ character, then control unit 10 determines that the previous long break was not intended to signify the beginning of the escape sequence. Accordingly, control unit 10 will set 62 the HS bit to 0, set 62 the I/O parameters of DART 13 back to the original setting, and then perform 61 the other operations.

If 81 the HS bit is a 0, then the data in DART 13 is data in a document, so control unit 10 stores 84 T in RAM 12 at TR1. If 85 the ED bit is a 1, then this data is the first data of a new document, so control unit 10 sets 86 the ED bit back to 0, marks 86 the beginning of the new document, stores 86 the data D in the replay buffer, and then performs 61 other operations. However, if the ED bit was a 0, then this data is more data in an existing document so control unit 10 simply stores 87 D in the replay buffer and performs 61 other operations.

It will be appreciated that a window of 700 milliseconds (1500–800 milliseconds) is allowed for the break signal to be dropped. However, it will also be appreciated that the 800 millisecond and 1500 millisecond times are not critical and may be chosen to be other values. In fact, the maximum break time can, if desired, be deleted so that the break signal drop window never closes.

It will also be appreciated that the 21 millisecond lapse time is not critical and may be another value, or deleted so that the $ character can occur at any time after the break signal is dropped.

In the preferred embodiment, the minimum and maximum break times, the lapse time, the spacing time, and the predetermined character are programmable by the user when control unit 10 is in the command mode.

Also, in many applications, it is necessary to be able to send the break signal on to a modem or other device connected to another port. If control unit 10 detects the break signal, and there is no other data to be sent to the other device, then control unit 10 will send an idle signal to the other device. If, however, at the end of the maximum break time, control unit 10 is still detecting the break signal then control unit 10 will begin sending the break signal to the other device.

It will also be appreciated that, instead of updating the TOD register in RAM 12, control unit 10 could read the current time value (T) in the real time clock 20.

It will be appreciated that the flow chart of FIGS. 2A and 2B represents one way of accomplishing the desired results: automatic document marking, and escape sequence detection. It will also be appreciated that control unit 10 may perform other operations before and after each step shown above. Since many other variations and embodiments of the present invention may suggest themselves to those skilled in the art based upon the foregoing disclosure, the present invention is to be limited only by the claims below.

We claim:

1. In an asynchronous data communications device of the type which is operable at a plurality of different data transmission rates, having at least a first port for connecting said asynchronous data communications device to data terminal equipment and a second port for connecting said asynchronous data communications device to a data utilization circuit, and further having two distinct modes of operation:

(a) a transparent mode of operation in which said data communications device provides output data signals to said second port, said output data signals corresponding to input data signals provided to said first port by said data terminal equipment; and (b) a command mode of operation in which said data communications device responds to said input data signals provided to said first port by said data terminal equipment as instructions to said data communications device;

an improved escape apparatus, operable when said data communications device is in said transparent mode of operation, comprising:

detection means connected to said first port for detecting each occurrence of provision of a break signal to said first port by said data terminal equipment; and timing means responsive to said detection means for providing a time out signal in response to each occurrence of said detection means detecting said break signal for at least a predetermined period of time;

wherein said detection means is further responsive to said time out signal and said input data signals to cause said data communications device to switch to said command mode of operation if said input data signals following termination of said break signal corresponds to a predetermined character transmitted at a particular one of said plurality of different data transmission rates, and otherwise causes said data communications device to remain in said transparent mode of operation.

2. An improved escape apparatus as recited in claim 1 wherein:

said predetermined period of time is at least as long as a predetermined minimum time for a valid break signal at the lowest one of said plurality of data transmission rates.

3. An improved escape apparatus as recited in claim 1 wherein:

said particular one of said plurality of different data transmission rates is the fastest of said plurality of different data transmission rates.

4. An improved escape apparatus as recited in claim 1 wherein:

said first port comprises a universal asynchronous receiver transmitter (UART); and further comprising port control means connected to said UART and to said timing means for forcing said UART to operate at said particular one of said plurality of different data transmission rates in response to each occurrence of said time out signal.

5. An improved escape apparatus as recited in claim 4 wherein:

said predetermined data transmission rate is a first predetermined data transmission rate;

said port control means is further responsive to said detection means to cause said UART to operate at a second predetermined one of said plurality of data transmission rates when said data communications device switches to said command mode of operation.

6. An improved escape apparatus as recited in claim 5 wherein:

said first and second predetermined ones of said plurality of different data transmission rates are the same.

7. An improved escape apparatus as recited in claim 1 wherein:

said predetermined data transmission rate is a first predetermined data transmission rate;

said data communications device includes means for storing a stored speed signal for determining a second particular one of said plurality of different data transmission rates at which said data communications device is operating when in said transparent mode of operations;

said input port comprises a UART; and said data communications device further comprises port control means connected to said UART and to said timer means for forcing said UART to operate at said first predetermined one of said plurality of different data transmission rates in response to each occurrence of said time out signal and for forcing said UART to return to operation at said second predetermined one of said plurality of data transmission rates in response to said detection means detecting a character other than said predetermined character as the first character transmitted after provision of said time out signal by said timer means.

8. An improved escape apparatus as recited in claim 1 wherein at least one of the following is selectably programmable: said predetermined period of time; and said predetermined character.

9. An improved escape apparatus as recited in claim 1 wherein:

said detection means is further responsive to said input data signals following termination of said break signal when said time out signal is being provided by said timing means; and said timing means is further responsive to said input data signals to terminate said time out signal if said break signal remains on said first port a second predetermined period of time after said time out signal was first provided.

10. An improved escape apparatus as recited in claim 9 wherein:

said timing means is further responsive to termination of said break signal when said time out signal is present to begin timing a third predetermined period of time; and said detection means is responsive to said timing means to terminate said time out signal and cause said data communications device to remain in said transparent mode of operation if input data signals are not received at said first port during said third predetermined period of time.

11. An improved escape apparatus as recited in claim 10 wherein:

said third predetermined period of time is less than said second predetermined period of time; and said detection means is responsive to said timing means to terminate said time out signal and cause said data communications device to remain in said transparent mode of operation if data input signals are not received at said first port during said third predetermined period of time.

12. An improved escape apparatus as recited in claim 9 wherein said second predetermined period of time is selectably programmable.

13. In an asynchronous data communications device of the type which is operable at a plurality of different data transmission rates, having at least a first port for connecting said asynchronous data communications device to data terminal equipment and a second port for connecting said asynchronous data communications device to a data utilization circuit, and further having two distinct modes of operation:
- (a) a transparent mode of operation in which said data communications device provides output data signals to said second port, said output data signals corresponding to input data signals provided to said first port by said data terminal equipment; and
- (b) a command mode of operation in which said data communications device responds to said input data signals provided to said first port by said data terminal equipment as instructions to said data communications device;

an improved method for escaping said apparatus from said transparent mode of operation to said command mode of operation, comprising the steps of:

detecting each occurrence of provision of a break signal to said first port by said data terminal equipment;

providing a time out signal in response to each occurrence of said break signal for at least a predetermined period of time; and responding to said time out signal and said input data signals by causing said data communications device to switch to said command mode of operation if said input data signals following termination of said break signal corresponds to a predetermined character transmitted at a particular one of said plurality of different data transmission rates, and otherwise causing said data communications device to remain in said transparent mode of operation.

14. The improved method of claim 13 wherein:
said predetermined period of time is at least as long as a predetermined minimum time for a valid break signal at the lowest one of said plurality of data transmission rates.

15. The improved method of claim 13 wherein:
said particular one of said plurality of different transmission data rates is the fastest one of said plurality of different data transmission rates.

16. The improved method of claim 13 and further comprising:
causing said data communications device to switch to said command mode of operation if said input data signals following termination of said predetermined non-idle signal occurs when said time out signal is present; and being responsive to said input data signals by terminating said time out signal if said predetermined non-idle signal condition remains on said first port a second predetermined period of time after said time out signal was first provided.

17. The improved method of claim 16 and further comprising:
responding to termination of said non-idle signal when said time out signal is present by beginning to time a third predetermined period of time; and terminating said time out signal and causing said data communications device to remain in said transparent mode of operation if said data input signals are not received at said first port during said third predetermined period of time.

18. The improved method of claim 17 wherein said third predetermined period of time is less than said second predetermined period of time, and further comprising:
terminating said time out signal and causing said data communications device to remain in said transparent mode of operation if said data signals are not received at said first port during said third predetermined period of time.

* * * * *